INVENTORS
WILLIAM B. TEMPLETON.
FRED W. HOWARD.
BY
Harry R. Dumont
ATTORNEY.

April 10, 1962 W. B. TEMPLETON ETAL 3,029,075
STACK HEIGHT SENSING APPARATUS
Filed Feb. 19, 1960 5 Sheets-Sheet 3

INVENTORS.
WILLIAM B. TEMPLETON.
FRED W. HOWARD.
BY
Harry R. Dumont
ATTORNEY.

April 10, 1962 W. B. TEMPLETON ETAL 3,029,075
STACK HEIGHT SENSING APPARATUS
Filed Feb. 19, 1960 5 Sheets-Sheet 4

INVENTORS.
WILLIAM B. TEMPLETON.
FRED W. HOWARD.
BY

ATTORNEY.

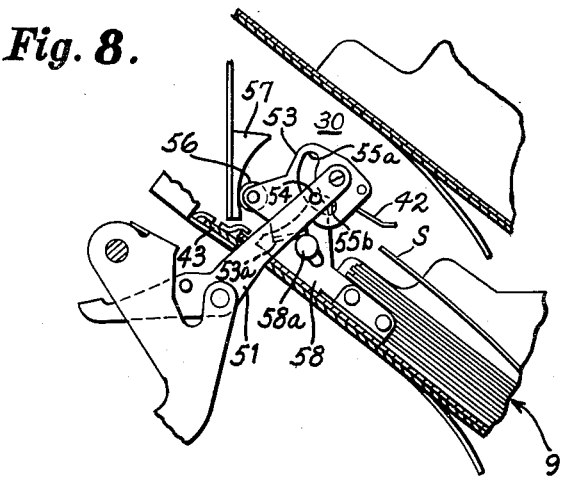
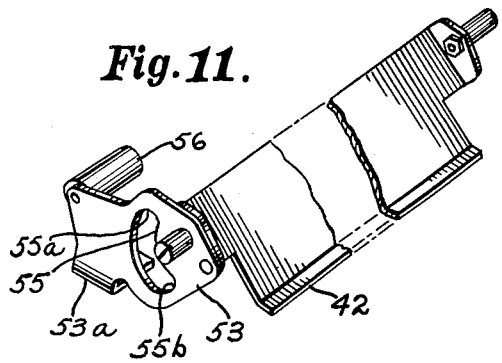
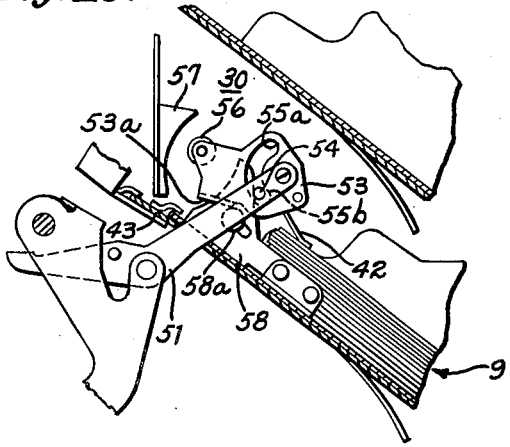

United States Patent Office 3,029,075
Patented Apr. 10, 1962

3,029,075
STACK HEIGHT SENSING APPARATUS
William B. Templeton, Northville, and Fred W. Howard, Detroit, Mich., assignors to Burroughs Corporation, Detroit, Mich., a corporation of Michigan
Filed Feb. 19, 1960, Ser. No. 9,729
15 Claims. (Cl. 271—86)

This invention relates generally to document sorting apparatus and more particularly to a stack height sensing apparatus therefor.

In bookkeeping apparatus and the like into which sheets are delivered in rapid sequence one at a time to a stack into a container, it is desirable to provide a full condition sensing apparatus which is capable of sensing the stack after each sheet is fed and is capable of indicating when a full condition exists to permit timely emptying of the container to avert a jam-up condition. Such a device must avoid frictional engagement and blockage of the sheet being fed during its travel toward the stack when the sensing member is also traveling in a path toward the stack. In addition, the return of the sensing member to its normal or homing position must have a suitable action to prevent engagement with the trailing edge of a sheet previously fed to the stack so that its final movement into the stack will not be impeded.

It is an object of this invention to provide an improved stack height sensing mechanism for use in a container for a stack of sheets.

It is an additional object of this invention to provide an improved stack height sensing mechanism for use in a container for a stack of sheets into which sheets are fed one at a time.

It is a further object of this invention to provide an improved stack height sensing mechanism for use in a container for a stack of sheets into which sheets are fed one at a time which is operable to sense during the feeding of a sheet.

It is a still further object to provide an improved stack height sensing mechanism which is operable during the feeding of a sheet onto a stack in a container and which travels in a path substantially the same as that of the entering sheet.

In accordance with the foregoing objects, the invention briefly described is a sensing device incorporated in a container or bin in which sheets are fed singly. An operating lever which carries a cam follower pivotally mounted on its free end and cooperable with a pair of opposed cams is movable in a path toward and away from the stack of sheets during the feeding of a sheet onto the stack in a path substantially coincident with the path of the sheets. A sensing member is mounted on the cam follower and is adapted to sense the uppermost sheet in the stack during the feeding of a sheet. Indicating means are provided for showing a full condition of the receptacle in response to the movement of the operating lever through a predetermined distance.

The foregoing and other objects, features, and advantages of the invention will be explained in the following description of a preferred embodiment of the invention illustrated in the accompanying drawings in which:

FIGS. 4 through 10 illustrate the successive stages of movement of the stack height sensing mechanism from its vertical homing position to a sensing position abutting on the top of the sheet stack;

FIG. 11 is a partial perspective view of the full bin bail.

Figure 1:
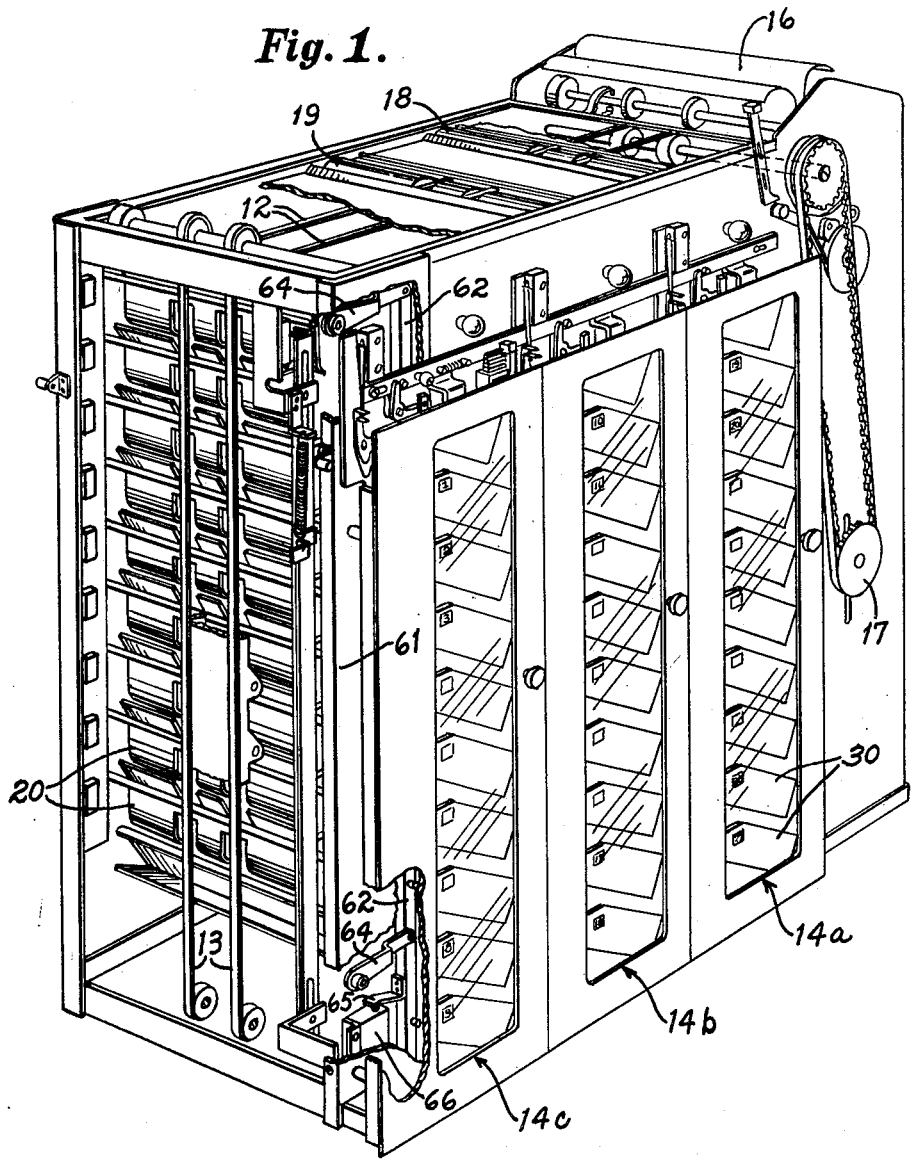
FIG. 1 is a perspective view of a document sorting apparatus with parts broken away.

In FIG. 1 a document sorting apparatus is illustrated which is similar in construction and mode of operation to one described and claimed in U.S. application Serial No. 705,443, "Bank Proof System" filed in behalf of Fettig et al. on December 26, 1957, and of common ownership herewith. The document sorting apparatus described and claimed in the Fettig application may be described briefly as a sorter having a plurality of sorted document bins, an inserted document receiver, and control means for directing the document conveyed from the receiver into a selected one of the bins. A document receiving throat 16 is provided for document insertion. A single horizontal belt conveyor 12 is provided and a vertical belt conveyor 13 is provided for each of the three vertical bin sections 14a, b, and c, each containing nine vertically disposed containers or bins 30. A common drive mechanism comprising a continuously running motor is provided for the horizontal and vertical belt conveyors, as indicated generally by the numeral 17. A pair of column deflectors 18 and 19 are provided adjacent the horizontal conveyor 12 and its junction with the vertical belt conveyor for bin sections 14a and 14b respectively whose function is to divert a document in accordance with the bin section in which the individual selected bin is located. A plurality of individual bin deflectors 20, nine in number, are provided adjacent to the vertical belt conveyor 13 for each bin section 14a, b, and c, which function to divert documents fed into the individual bin designated. Also shown is a portion of the full condition indicating means including slide 62, projection 65, and switch 66.

Figure 2:
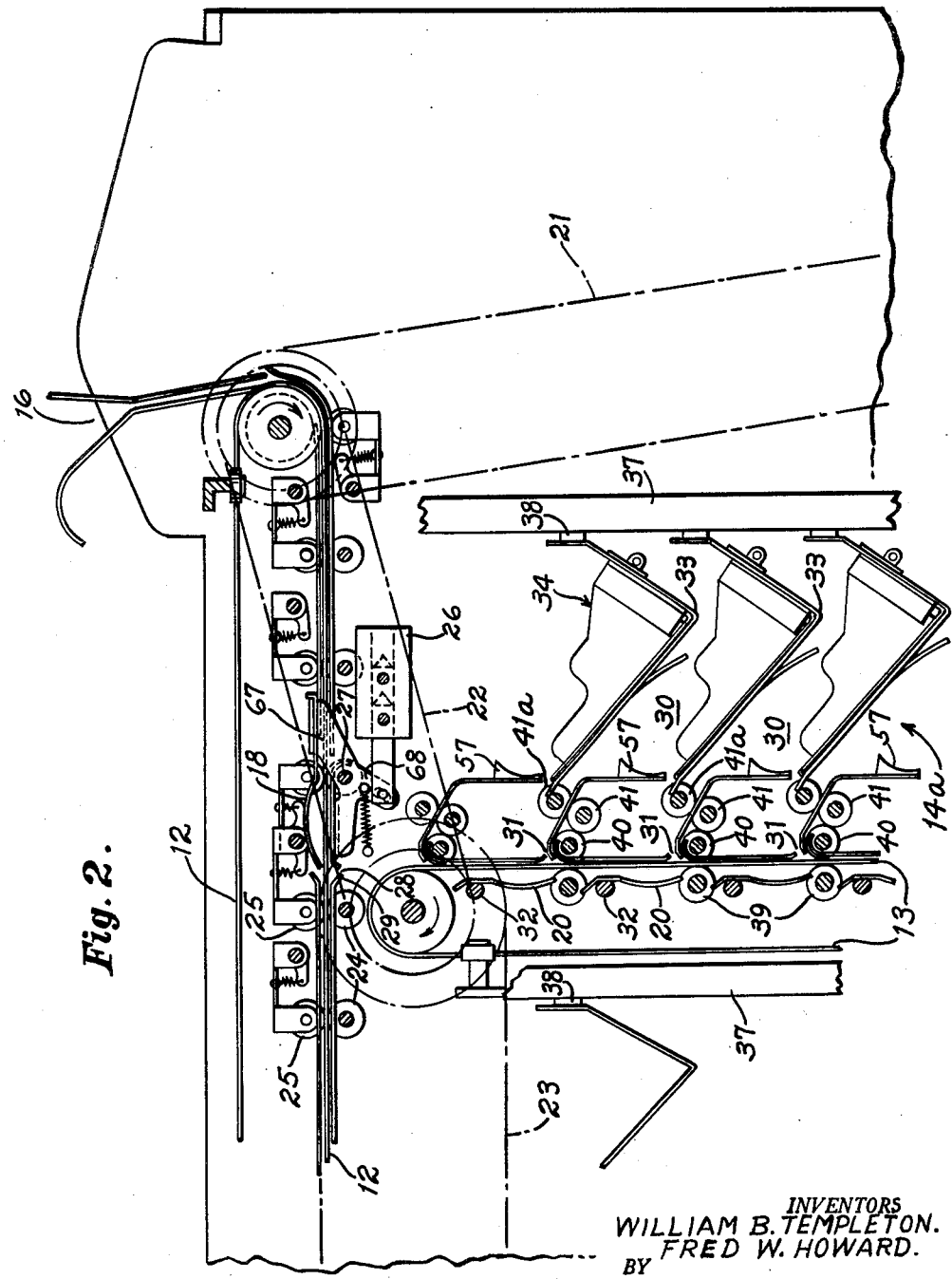
FIG. 2 is a diagrammatic view of a document sorter showing a portion of the document conveying system and bin arrangement.

In FIG. 2 is shown belt 21 which receives its drive from a motor as indicated in FIG. 1 and rotates in a clockwise direction to drive horizontal conveyor belt 12 and simultaneously to provide a drive through belts 22 and 23 to the three vertical belt conveyors provided for bin sections 14a, b, and c, of which 14a is illustrated. A plurality of stationary rollers 24 are disposed along the lower surface of belt 12 and a plurality of rollers 25 each being spring biased against the upper surface of belt 12 and in opposition to a roller 24. The column deflector plate 18 is affixed to lever 67 above belt 12. Lever 67 is journalled on transverse shaft 27 and has its downwardly projecting arm 68 coupled to the working core or plunger of solenoid 26. Energization of solenoid 26 will rock lever 67 counterclockwise and operate column deflector 18 to divert a sheet through aperture 28 in guide plate 29 onto vertical belt conveyor 13. A plurality of bins 30 are vertically disposed, nine in each of the three bin sections 14a, b, and c, each having an aperture 31 for admitting a sheet thereto. Opposite each aperture 31 is a bin deflector 20 pivotally mounted adjacent to a shaft 32 and pivotable to divert a sheet being driven downward by frictional engagement with belt 13 into a selected bin 30. The individual bins 30 are separated by bin separators 33 which serve as supports for removable sheet containers 34 each being adapted to hold a stack of sheets. Each of the bin separators 33 is rigidly mounted in position upon its respective rightwardly located vertical support 37 on a projection 38. Sheets in transport by means of belt 13 are retained in position by fixed rollers 39. While FIG. 2 shows the structural detail of bin section 14a only, the bins in bin sections 14b and c are constructed in a like manner.

To insure that sheets diverted from the vertical conveyor by a bin deflector 20 will be positively fed into the bin, through its aperture 31, roller 40 is located below the aperture and is in frictional engagement with the belt of vertical belt conveyor 13. A second roller 41 is in frictional engagement with roller 40 and is driven in a clockwise motion thereby. An additional roller 41a is spring biased downwardly into engagement with roller 41 and rotated in a counterclockwise direction to provide a driving means for any sheet which has been diverted by bin deflector 20 into the bin 30.

Figure 3:
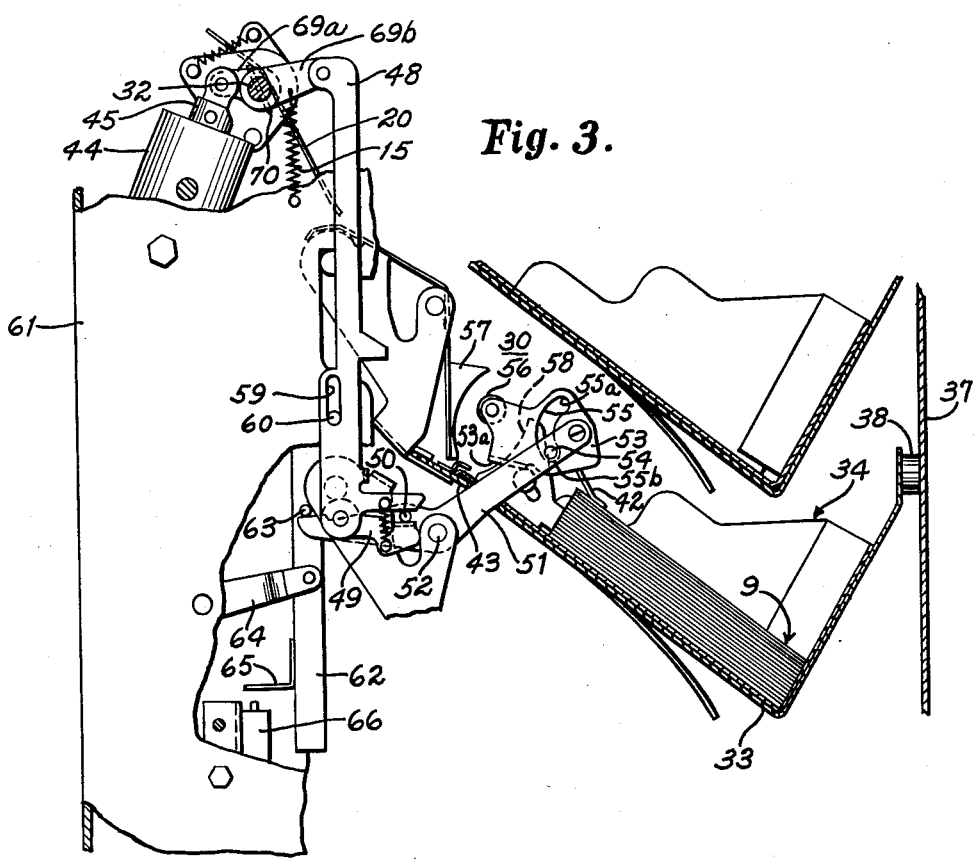
FIG. 3 is a fragmentary right side elevation of a bin receiving section showing the stack height sensing apparatus, bin deflector, and the actuating mechanism therefor.

FIG. 3 shows a stack height sensing member hereinafter referred to as a bail 42 which extends in the form of a blade extending transversely over substantially the width of the stack through an aperture 43 through the bottom of a bin separator plate 33 and through the bottom of the removable sheet container 34 into each individual bin. The bail 42 is operated to engage the top of the stack 9 of sheets during each cycle of operation of the sorter. The actuating mechanism for each bail includes a number of mechanical elements actuated by its respective operating solenoid 44. The solenoid plunger 45 is coupled to the arm 69a of bell crank 69a, b, which is pinned to shaft 32. A vertical link 48 is rotatably mounted at its upper end on the rearward arm 69b of bell crank 69a, b. At its lower end the link 48 is coupled by a broken joint connection 49 to a stud 50 on the forward arm of operating lever 51. A vertical slot 59 is provided in link 48 engaging a stud 60 mounted on machine side frame 61 for guidance. Operating lever 51 is pivotally mounted on transverse shaft 52 and has a forward arm 49. Bail 42 is rigidly fixed to a cam follower plate 53 having a lip portion 53a which is pivotally mounted near the rearward extending and free end of operating lever 51. A stud 54 mounted near the end of operating lever 51 engages an arcuate slot 55 having ends 55a and 55b formed in plate 53 which serves as means for limiting the rotation of cam follower 53 about operating lever 51. Cam follower plate 53 carries a roller 56 which is adapted to cooperate with a pair of opposed cam members 57 and 58 which are mounted in opposed relationship within the forward end of each bin 30. Stud 58a projects laterally from cam member 58 and permits adjustment of cam member 58 relative to cam member 57. Mechanical clearance is provided between the cam roller 56 and the cam surface of the cam member 58 when the operating lever 51 is in its vertical or home position and a like clearance is provided between the cam roller 56 and the cam surface of cam member 57 when the operating lever 51 is in its rearward and lowered sensing position with the bail 42 engaging the uppermost sheet in a stack 9. A vertical, differentially positionable slide 62 is provided in alignment with link 48 for each of the three bin sections. The slide 62 carries a stud 63 which is engaged by the forward arm of operating lever 51, during its movement with the bail 42 toward the stack of sheets. The slide 62 is pivotally supported and connected to an arm 64 at its lower end. Slide 62 carries a lateral projection 65 near its lower end and normally engages the movable contact of a switch 66, one of which is provided for each bin section 14a, b, and c. The weight of each slide 62 is sufficient to maintain the switch in an operated position, the latter being a self-restoring single-pole, double-throw switch normally closed at one side. When the slide 62 is in its normal lowered positions, the normally opened contact of the switch is closed and the normally closed contact is open. However, when a slide 62 is sufficiently elevated by the forward extension of operating lever 51, operating to raise stud 63, the associated switch 66 restores whereby the normally closed contact is closed and the normally opened contact is opened. The switch 66 is coupled in a circuit which operates to warn the operator of a full bin condition when the stack height is such that movement of slide 62 away from the movable contact of switch 66 is insufficient to operate the switch, and to accomplish various other functions as disclosed in full in the aforementioned Fettig et al. application. After the solenoid 44 has been energized to divert a sheet into its proper bin, the plunger 45 is restored to a normal position by spring 15 anchored to side frame 61 and which also acts to pivot bell crank 69a, b, about shaft 32 in a clockwise manner to lower link 48 to its normal position with projection 65 engaging the movable contact of switch 66. The solenoid 44 also serves to actuate bin deflector 20 to divert a document into its respective bin 30. This is accomplished by an arm 70 pinned to shaft 32. When the solenoid 44 is energized the movement of plunger 45 downwardly will rock shaft 32 with arm 70 counterclockwise so that it will engage deflector plate 20 and move its lower portion in a counterclockwise direction to divert a sheet into the selected bin 30. De-energization of solenoid 44 and the restoring force of spring 15 will rock arm 70 in a clockwise direction against the upper portion of deflector plate 20 to restore it to its normal position in which the lower portion of the deflector plate is substantially parallel to belt conveyor 13.

*Description of Operation*

Figure 4:
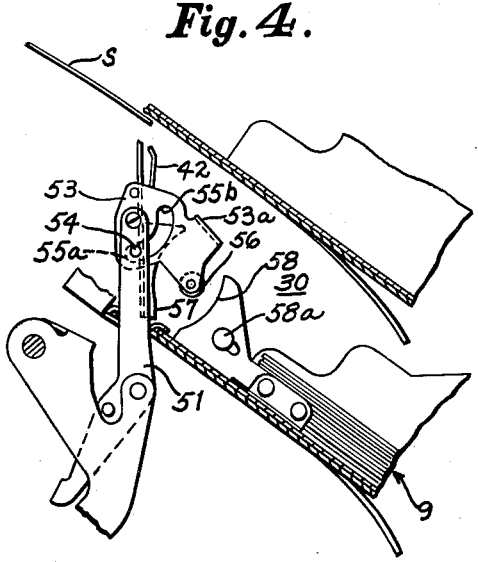
Figure 5:
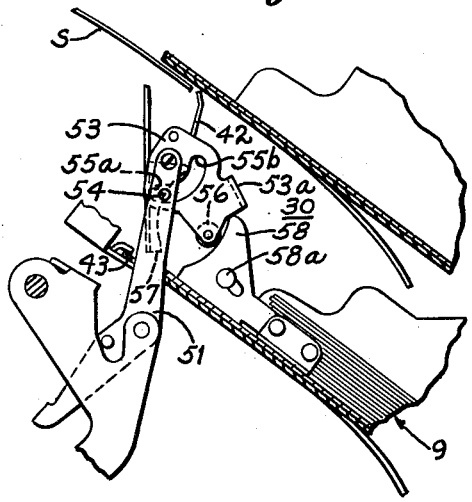
Figure 6:
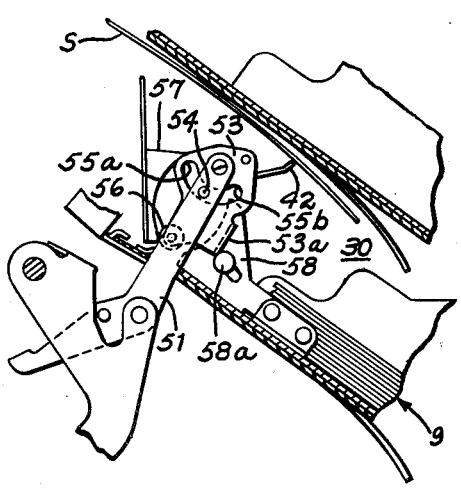
Figure 7:
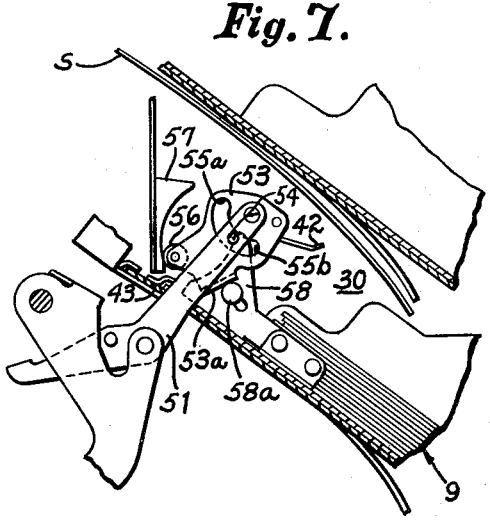

At the beginning of a sorting cycle a sheet is fed into the document receiving throat 16 and passes in a horizontal path between opposing rollers 24 and 25 until it reaches a column deflector plate 18. As best shown in FIG. 2, energizing of solenoid 26 by means of controls described in the aforementioned Fettig application will cause deflector 18 to be rocked and to divert the sheet into a vertical belt conveyor 13. The sheet will pass downwardly in a vertical path until it is intercepted by one of the pocket deflector plates 20. Operation of the pocket deflector plates is accomplished by one of the plurality of solenoids 44 which in turn are activated by controls as described in the aforementioned Fettig application. At best shown in FIG. 3, the plunger 45 is moved inwardly so that bell crank 69a, b, is rocked in a counterclockwise direction. This causes simultaneous operation both of the individual bin deflector plate 20 and of the sensing mechanism associated with the same bin. Actuation of the bin deflector plate is accomplished by rocking of shaft 32 on which is pinned arm 70 to cause a lower portion of deflector plate 20 to be moved in a counterclockwise manner to divert the sheet into the aperture 31 of the appropriate bin 30. At the same time the counterclockwise rocking of bell crank 69a, b, causes the slide 48 to be moved upwardly. Through the broken joint connection 49 which encloses stud 50 on operating lever 51 the operating lever is moved arcuately and in a clockwise direction toward the stack. At the same time a sheet is diverted to enter one of the bins and passes through the aperture 31 and between opposing rollers 41 and 41a. As previously described, roller 40 is in frictional engagement with roller 41 and is being driven in a counterclockwise manner so that the sheet on entering the bin is given an additional force or momentum to propel the sheet into the bin as it passes between rollers 41 and 41a. As is best shown in FIG. 4, the homing position of the operating lever is a substantially vertical position in which stud 54 on the operating lever 51 engages the arcuate slot 55 in cam follower 53 at its extremity 55a. In its homing position the cam follower plate 53 has its roller 56 located with a mechanical clearance from the opposing cam member 58. As best seen in FIG. 5, the first movement of the operating lever in a downward and clockwise direction causes the roller 56 on the cam follower plate 53 to strike the cam surface of cam member 58 and pivot the cam plate 53 with a snap action about operating lever 51. The purpose of this is to cause the sensing bail referred to by numeral 42 to be moved out of the path of the entering sheet and at the same time during the course of its movement into the pocket if it should come into frictional engagement with the lower side of a sheet or the bin separator 33 located above, it will be averted from a common path so as not to impede the movement of the sheet toward the stack in the container. As is best shown in FIGS. 6 and 7, during further progress of the operating lever 51 downward into the pocket the cam plate 53 is free to rotate within limits of the arcuate slot 55, toward the limit of the slot 55a as the bail 42 approaches the uppermost sheet in the stack 9. As shown in FIG. 3, the camming action of lip 53a engaging stud 58a extending from cam member 58 will initiate the rotating movement of cam plate 53 around operating lever 51. FIGS. 8, 9, and 10 illustrate further stages in the downward and sensing movement of the operating lever 51 until, as shown in FIG. 10, the stud 54 limits at the slot end 55b as the bail 42 rests on the top of the stack. FIGS. 4 through 10 illustrate the optimum operative condition wherein the sheet S has been imparted sufficient momentum by the rollers 41 and 41a to cause it to pass the moving bail 42 and come to rest on the top of the stack before the sensing is accomplished. In actual operation, the sensing movement of the bail may occur before the sheet fed has come to rest on the stack, in which case the trailing edge of the partially entered sheet will present an obstruction to the return of the bail 42 to its vertical homing position. During the movement clockwise of operating lever 51 the forward arm 49 of the operating lever engages stud 63 on slide 62 imparting a degree of upward movement to slide 62. This degree of upward movement is dependent upon the movement of the operating lever from its upward vertical position to its sensing position on the top of the sheet stack. If this movement is sufficient to displace projection 65 from the movable contact of switch 66 a circuit will be energized as described in the aforementioned Fettig application which will operate to warn the operator of a full bin condition. During the return movement of the operating lever to its homing position cam surface of cam member 57 operates in a manner analogous to cam 58 on the downward path of the operating lever. Once again when the roller 56 of cam follower 53 engages the cam surface the cam follower 53 is given a snap action or quick pivotal movement about operating lever 51. This serves to free the full bin sensing bail 42 which may have come in engagement with the trailing edge of a previously entered sheet and will hence prevent hang-up and a possible jam condition being caused by a return drag on the entering sheet. Again the cam follower 53 is free to rotate about operating lever 51 but is limited as the operating lever attains its homing position by the slot limit 55a in arcuate slot 55. As shown in FIG. 3, return of the pocket deflector plate 20 and of the operating lever 51 to their normal position is accomplished by the biasing spring 15 which supplied a downward biasing force to rotate the bell crank 69a, b in a clockwise direction and to displace slide 48 downwardly. This permits slide 62 to return by reason of its own weight to its normal position in engagement with the movable contact of switch 66 and in preparation for a second actuation of a bin deflector and full bin bail operation in the same or another one of the three bin sections 14, 15, or 16. It is readily apparent that we have provided an improved full bin sensing apparatus which is capable of being operated during the time of entry of a sheet into the bin. The full bin operating mechanism is such that it is moved to avert the bail from the path of an entering sheet to avert the sensing blade from engagement with the lower surface of an entering sheet and on its return to again avert the blade from frictional engagement with the trailing edge of an entering sheet which may still form an obstruction to its removal from the bin.

What is claimed is:

1. In a container for receiving sheets in a stack, a mechanism for sensing the height of the stack comprising an operating lever having a free end, means for moving said operating lever between a home and a stack sensing position, a cam follower pivotally mounted proximate the free end of said operating lever, a sensing member mounted on said cam follower operable to sense the uppermost sheet in the stack, a pair of opposed cams, one of said cams mounted in the path of movement of said operating lever away from the stack and operable to rotate said cam follower with a snap action away from the stack about said operating lever during its movement away from the stack, and the other of said cams mounted in the path of movement of said operating lever toward the stack and operable to rotate said cam follower with a snap action toward the stack about said operating lever during its movement toward the stack.

2. In a container for receiving sheets in a stack, a mechanism for sensing the height of the stack comprising an operating lever having a free end, means for moving said operating lever between a home and a stack sensing position, a cam follower pivotally mounted proximate the free end of said operating lever, a sensing member carried on said cam follower operable to sense the uppermost sheet in the stack, a pair of cams, one of said cams mounted in the path of movement of said operating lever toward the stack operable to rotate said cam follower with a snap action about said operating lever toward the stack, and the other of said cams mounted in the path of movement of said operating lever away from the stack operable to rotate said cam follower with a snap action about said operating lever away from the stack, said operating lever having a variable extent of movement toward the stack dependent upon the stack height, and means for indicating a full condition of the container responsive to a predetermined extent of movement of said operating lever.

3. In a container for receiving sheets in a stack, a mechanism for indicating the height of the stack comprising an operating lever having a free end, means for moving said operating lever between a home and a stack sensing position, a cam follower pivotally mounted over-center proximate the free end of said operating lever, a sensing member comprising a bail extending transversely across the top of the stack operable to sense the uppermost sheet in the stack, a pair of opposed cams, one of said cams mounted in the path of movement of said operating lever toward the stack and operable to rotate said cam follower with a snap action about said operating lever in the direction of its movement toward the stack, the other of said cams mounted in the path of movement of said operating lever away from the stack and operable to rotate said cam follower with a snap action in the direction of its movement away from the stack, said operating lever having a variable extent of movement toward the stack dependent upon the stack height, and means for indicating a full condition of the container responsive to a predetermined extent of movement of said operating lever.

4. In a container for receiving sheets in a stack, a mechanism for indicating the height of the stack comprising an operating lever having a free end, means for moving said operating lever between a home and a stack sensing position, a cam follower pivotally mounted proximate the free end of said operating lever, a sensing member mounted on said cam follower operable to sense the uppermost sheet in the stack, a pair of cam members mounted inside the container having opposed and similar concave cam surfaces, one being operable to rotate said cam follower with a snap action about said operating lever in the direction toward the stack during the movement of said operating lever toward the stack and the other being operable to rotate said cam follower with a snap action about said operating lever in a direction away from the stack during the movement of said operating lever away from the stack.

5. In a container for receiving sheets in a stack, a mechanism for indicating the height of the stack comprising an operating lever having a free end, means for moving said operating lever between a home and a stack sensing position, a cam follower pivotally mounted on the free end of said operating lever, a sensing member mounted on said cam follower operable to sense the uppermost sheet in the stack, a pair of opposed cams, one of said cams mounted in the path of movement of said operating lever toward the stack and operable to rotate said cam follower with a snap action about said operating lever toward the stack and the other of said cams mounted in the path of movement of said operating lever away from the stack and operable to rotate said cam follower with a snap action about said operating lever away from the stack, said operating lever having a home position prior to entry of a sheet into the container wherein mechanical clearance is maintained between said cam follower and the cam surface of the opposite one of said cams.

6. In a container for receiving sheets in a stack, a mechanism for indicating the height of the stack comprising an operating lever having a free end, means for moving said operating lever between a home and a stack sensing position, a cam follower pivotally mounted on the free end of said operating lever, a sensing member rigidly mounted on said cam follower operable to abut on the uppermost sheet in the stack, a pair of cams, one being mounted in the path of movement of said operating lever toward the stack and operable to rotate said cam follower with a snap action about said operating lever toward the stack and the other of said cams mounted in the path of movement of said operating lever away from the stack and operable to rotate said cam follower with a snap action about said operating lever away from the stack, said cam follower having a mechanical clearance from the opposed cam during the engagement of said sensing member with the uppermost sheet in the stack.

7. In combination, means for directing a sheet in a path toward a stack and means for sensing the uppermost sheet in the stack operable to move in a path substantially coincident with the path of the moving sheet comprising an operating lever, means for moving said operating lever between a home and a stack sensing position, a cam follower pivotally mounted on said operating lever, a sensing member mounted on said cam follower, and a cam member mounted intermediate said operating lever and the stack and operable to rotate said cam follower and said sensing member with a snap action away from the path of a sheet.

8. In combination, a pivotable deflector plate for directing a sheet in a path toward a stack and means for sensing the uppermost sheet in the stack operable to move in a path substantially coincident with that of the moving sheet comprising an operating lever, means for moving said operating lever between a home and a stack sensing position, a cam follower pivotally mounted on said operating lever, a sensing member carried by said cam follower, a cam member mounted intermediate said operating lever and the stack and operable to rotate said cam follower with a snap action away from the path of a sheet, and common operating means for said deflector plate and said sensing member.

9. In combination, a pivotable deflector plate for directing a sheet in a path toward a stack, means for sensing the uppermost sheet in the stack operable to move in a path substantially coincident with that of the moving sheet comprising an operating lever, means for moving said operating lever between a home and a stack sensing position, a cam follower pivotally mounted on said operating lever, a sensing member mounted on said cam follower, and a cam member mounted in the path of movement of said operating lever toward the stack operable to rotate said cam follower with a snap action away from the path of a sheet, and common operating means operable to activate at the same time said deflector plate and said sensing means.

10. In combination, a pivotable deflector plate for directing a moving sheet in a substantially horizontal path toward a stack, means for sensing the uppermost sheet in the stack operable to move in a path substantially coincident with that of the moving sheet comprising an operating lever, means for moving said operating lever between a home and a stack sensing position, a cam follower pivotally mounted on said operating lever, a sensing bail mounted on said cam follower, and a cam member mounted intermediate said operating lever and the stack operable to rotate said cam follower with a snap action away from the path of a sheet and electromagnetic operating means operable to activate said deflector plate and said sensing means.

11. In combination, means for directing a sheet into a path toward a stack, means for sensing the uppermost sheet in the stack operable to move in a path substantially coincident with that of the moving sheet comprising an operating lever, means for moving said operating lever between a home and a stack sensing position, a cam follower pivotally mounted on said operating lever, a sensing member mounted on said cam follower, and a pair of cams, one of said cams being mounted intermediate said operating lever and the stack operable to rotate said cam follower with a snap action away from the path of a sheet and toward the stack during movement of said operating lever toward the stack and the other of said cams being mounted in the path of movement of said operating lever away from the stack operable to rotate said cam with a snap action away from the path of a sheet during movement of said operating lever away from the stack, and common operating means for said directing means and said sensing means.

12. In combination, a pivotable deflector plate for directing a sheet into a path toward a stack, means for sensing the uppermost sheet in the stack operable to move in a path coincident with that of the moving sheet comprising an operating lever having a free end, means for moving said operating lever between a home and a stack sensing position, a cam follower pivotally mounted over-center proximate the free end of said operating lever, a sensing bail mounted on said cam follower, and a cam member mounted intermediate said operating lever and the stack having a concave cam surface juxtaposted to said cam follower and operable to rotate said cam follower with a snap action toward the stack during movement of said operating lever toward the stack, and common operating means for said deflector plate and said sensing means.

13. In combination, a pivotable deflector plate for directing a sheet into a path toward a stack, means for sensing the uppermost sheet in the stack operable to move in a path substantially coincident with that of the moving sheet comprising an operating lever having a free end, means for moving said operating lever between a home and a stack sensing position, a cam follower pivotally mounted proximate the free end of said operating lever, a sensing member carried by said cam follower, and a stationary cam member having a concave cam surface juxtaposed to said cam follower intermedate the home position of said operating lever and the stack and operable to rotate said cam follower with a snap action away from the path of the sheet in the direction of the stack during movement of said operating lever toward the stack.

14. In combination, a pivotable deflector plate for directing a sheet in a path toward a stack, means for sensing the uppermost sheet in the stack operable to move in a path substantially coincident with that of the moving sheet comprising an operating lever having a free end and a stud affixed proximate thereto, means for moving said operating lever between a home and a stack sensing position, a cam follower having a slot pivotally mounted proximate the free end of said operating lever, a sensing bail carried by said cam follower, and a stationary cam member mounted intermediate the home and sensing positions of said operating lever operable to rotate said cam follower with a snap action away from a sheet and toward the stack during movement of said operating lever toward the stack, said stud on said operating lever in engagement with the slot in said cam follower to limit the rotation of said cam follower about said operating lever, and common operating means for said deflector plate and said sensing means.

15. In combination, means for directing a sheet into a path toward a stack, means for sensing the uppermost sheet in the stack operable to move in a path substantially coincident with that of the moving sheet comprising an operating lever having a free end, means for moving said operating lever between a home and a stack sensing position, a cam follower pivotally mounted on said operative lever, a sensing member mounted on said cam follower, a stationary cam member mounted intermediate the home and sensing positions of said operating lever operable to rotate said cam follower with a snap action away from the sheet path during movement of said operating lever toward the stack, means for limiting the rotation of said cam follower about said operating lever, and common operating means for said directing means and said sensing means.

References Cited in the file of this patent
UNITED STATES PATENTS

| | | |
|---|---|---|
| 1,847,741 | Zent | Mar. 1, 1932 |
| 2,579,541 | Bobst | Dec. 25, 1951 |
| 2,595,346 | Federwitz | May 6, 1952 |